Patented Apr. 28, 1953

2,636,839

UNITED STATES PATENT OFFICE 2,636,839

INSECTICIDAL COMPOSITIONS

Herschel G. Smith, Wallingford, Mark L. Hill, Boothwyn, and Troy L. Cantrell, Lansdowne, Pa., assignors to Gulf Oil Corporation, Pittsburgh, Pa., a corporation of Pennsylvania No Drawing. Application October 17, 1949, Serial No. 121,901

10 Claims. (Cl. 167—24)

This invention relates to improved insecticidal compositions, and more particularly, to insecticidal compositions which are stabilized and benefited by the inclusion therein of certain novel additives.

The compounding and use of modern insecticidal compositions is variously complicated by many difficulties. Of these, one of the most serious is that of deterioration, which is almost inevitably accompanied by a loss of killing power. Many insecticides tend to deteriorate upon aging, such that haziness in the composition appears, followed by precipitation of the toxic ingredients or decomposition products thereof. In addition, the deterioration of many insecticides, particularly those comprised of pyrethrins or halogen-containing compounds, such as DDT, is noticeably hastened by exposure to the action of light rays and by oxidation. Furthermore, such compositions are inherently corrosive, and consequently applications thereof are often limited. The desirability of alleviating the above difficulties is apparent.

The killing power and knockdown of many insecticide toxicants is frequently capable of improvement. This is sometimes accomplished by means of appropriate additives termed synergists. The phenomenon of synergism is well known in the art, and, although the exact mechanism thereof is not fully known, the use of synergists is widely practiced. In this connection, it is also desirable to enhance the killing power of an insecticide after it has been applied to a surface, and this may be accomplished by the use of appropriate synergists.

Accordingly, this invention has as an object the provision of an insecticidal composition having enhanced killing power.

A further object is to provide compositions containing compounds capable of synergizing the killing properties of insecticidal toxicants.

A still further object is to provide insecticidal compositions which will exhibit improved killing properties and which will deposit a residual insecticide having increased surface action and prolonged toxicity against insects.

Another object is to provide insecticidal compositions which are stabilized against reduction of killing power due to aging or subjecting to light rays, and against deterioration and the formation of haze.

A still further object is to provide insecticidal compositions which have been stabilized against corrosive tendencies.

These and other objects are accomplished by the present invention wherein we provide insecticidal compositions comprising one or more insecticide toxicants, a solvent therefor and a condensation product of formaldehyde with a substantially neutral calcium salt of an N-alkyl phthalamidic acid, said condensation product having the following formula:

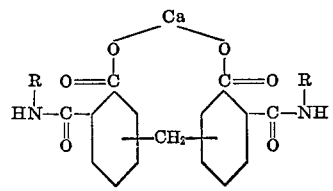

wherein R is an alkyl group having from 8 to 20 carbon atoms. Generally speaking, these compounds are high melting point salts, the specific melting points depending upon the size and nature of the substituent R. However, such compounds are readily soluble in petroleum hydrocarbon solvents such as are used as bases for insecticides.

The additive of our invention is preferably prepared by condensing equimolecular proportions of formaldehyde and a substantially neutral calcium N-alkyl phthalamidate (the alkyl group having from 8 to 20 carbon atoms) in the presence of an activated clay, such as the acid treated montmorillonite described in U. S. Patent No. 1,898,165. The temperature of the condensation ranges from about 100 to 180° F. and is continued until all of the formaldehyde is consumed. Thereafter the temperature is raised to about 250° F. to dehydrate the product. The following example shows the preparation of the additive.

*Example I.*—One mol of calcium N-cocophthalamidate was dissolved in 10 volumes of a light hydrocarbon solvent. There were then added one mol of formaldehyde (in the form of a commercial formalin solution containing 37 per cent by weight of anhydrous formaldehyde) and 10 per cent by weight of activated montmorillonite. The mixture was then heated with agitation under reflux until all of the formaldehyde had been consumed. Thereafter the water (both that added with the formaldehyde and formed in the reaction) together with the light hydrocarbon solvent were distilled off at a pot temperature not exceeding 250° F. and the clay removed by filtration. The melting point of the product was indeterminate and varied between 450 and 500° F. The variation in melting point is probably due to the fact that the cocoamine used in preparing the calcium N-cocophthalamidate is not a pure compound but is a mixture of primary alkyl amines prepared from coconut oil fatty acids by well known methods. Commercial cocoamine has an average molecular weight of about 200–210 and contains a major proportion of dodecyl amine and minor proportions of homologous amines. Thus, when the foregoing example was repeated using calcium N-dodecyl phthalamidate instead of calcium N-cocophthalamidate, the melting point of the formaldehyde condensed product was 472° F.

The preparation of the calcium N-alkyl phthalamidates used as initial reactants in the preparation of our additive is described in U. S. Patent No. 2,378,442. As there shown, these compounds are prepared from calcium hydroxide, phthalic anhydride, and primary alkyl amines. Among the primary alkyl amines which are used are octyl amine, decylamine, undecylamine, dodecylamine or laurylamine, myristylamine, cetylamine, stearylamine, eicosylamine and mixtures thereof.

The additives of this invention are soluble in the usual insecticide solvents. These include hydrocarbon solvents, such as deodorized naphthas, light lubricating oils, aromatic hydrocarbons, such as benzene, toluene and alkyl naphthalenes such as alphamethyl naphthalene. Other suitable solvents include acetone and alcohol. Typical properties of a deodorized naphtha are as follows:

| | |
|---|---|
| Gravity, °API | 51 |
| Flash, TCC °F | 154 |
| Cloud, °F | −42 |
| Color, Saybolt | +30 |
| Acid heat, °F | 1 |
| Aniline pt., °F | 175 |
| Distillation, ASTM D | 86–46 |
| Over point, °F | 377 |
| End point, °F | 487 |
| 10% | 394 |
| 50% | 420 |
| 90% | 464 |

The formaldehyde-calcium N-alkyl phthalamidate condensation products having the formula:

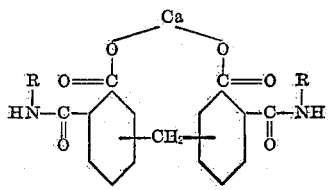

where R is an alkyl group of from 8 to 20 carbon atoms, are employed with beneficial results in any insecticidal composition employing any known insecticide toxicants. Thus, in the natural group, pyrethrum, rotenone, deguelin, tephrosin and nicotine insecticidal compositions are benefited. Advantages are also obtained when our additive is used with organic thiocyano insecticide toxicants, such as beta-butoxy, beta thiocyanodiethyl ether, thiocyano esters of the higher fatty acids, fenchyl thiocyanoacetate and bornyl thiocyanoacetate. Insecticide compositions containing halogenated hydrocarbon insecticide toxicants such as 2,2-bis (p-chlorophenyl)-1,1, 1-trichloroethane, gamma hexachlorocyclohexane, 2,2-bis (p-fluoro-phenyl)-1,1, 1-trichloroethane, dichlor diphenyl dichloroethane and chlordane or 1, 2, 4, 5, 6, 7, 8, 8-octachlor-4, 7-methano-3-alpha, 4, 7, 7-alpha-tetrahydroindane are also improved by our additive. Of course, insecticidal compositions containing more than one insecticide toxicant, such as mixtures of pyrethrins and DDT, mixtures of pyrethrins, chlordane and organic thiocyano derivatives such as beta thiocyanoethyl esters of fatty acids averaging 10 to 18 carbon atoms and beta-butoxy, beta'thiocyanodiethyl ether are also contemplated by our invention.

In general, our additive, when added to any insecticidal toxicant composition, has the effects of shortening the knockdown time, stabilizing the toxicant against oxidative deterioration, inhibiting corrosion and rusting of metal parts coming into contact with the insecticidal composition, and increasing the adhesiveness of insecticidal compositions. In pyrethrin containing sprays, in addition to stabilizing the insecticide against oxidative deterioration and deterioration by light, our additive synergizes the pyrethrins and also confers residual effects, i. e., a surface coated with a pyrethrin insecticide containing our new additive maintains its killing activity for a prolonged period. Synergistic effects are also obtained with halogenated hydrocarbon insecticide toxicants such as DDT and gamma hexachlorocyclohexane, and organic thiocyano insecticide toxicants such as fenchyl thiocyanoacetate.

The reaction product of Example I dissolved in a naphtha solution alone is relatively ineffective against the common house fly. This is evident from the data in Table I below showing the results of fly-killing tests performed with the reaction product of Example I by itself in a deodorized naphtha solution. The fly-killing test, Gulf Method 223, is set forth in detail in U. S. Patent No. 2,421,223.

Table I

| Description | Experimental Insecticide | Experimental Insecticide | Experimental Insecticide |
|---|---|---|---|
| Make-up, Percent by Vol.: | | | |
| Gulfspray Naphtha | 95.0 | 90.0 | 85.0 |
| Reaction Product in Spray Naphtha | 5.0 | 10.0 | 15.0 |
| Inspection: | | | |
| Gravity, ° API | 49.4 | 48.5 | 47.5 |
| Fly Killing Test—Method 223, Gulf— | | | |
| No. of Tests | 10 | 10 | 10 |
| No. of Flies | 909 | 882 | 896 |
| Temperature, ° F | 80 | 86 | 80 |
| Relative Humidity, Percent | 55 | 55 | 58 |
| Average Tests: | | | |
| Down, 10 Min., Percent | 78 | 86 | 92 |
| Time of Knockdown, Sec | | 93 | 94 |
| Killed, 24 hr., Percent | 19.1 | 33.7 | 43.5 |
| Difference between Kill of Test Sample and Official Test Insecticide | −29.3 | −16.0 | −2.0 |

However, this same reaction product of Example I was found to have a pronounced synergistic effect upon pyrethrins, as evidenced by the experimental data shown in Table II below.

Table II

| Composition | I | II |
|---|---|---|
| Make-up, Percent by Vol.: | | |
| Pyrethrum Extract, 100 Mg. Pyrethrins/100 Cc | 100.0 | 95.0 |
| Reaction Product according to this Invention | | 5.0 |
| Inspection: | | |
| Fly Killing Test—Method 223, Gulf— | | |
| No. of Tests | 10 | 10 |
| No. of Flies | 972 | 911 |
| Temperature, ° F | 81 | 81 |
| Relative Humidity, Percent | 53 | 58 |
| Average Tests: | | |
| Down, 10 Min., Percent | 97 | 98 |
| Time of Knockdown, Sec | 50.6 | 38.8 |
| Killed, 24 Hr., Percent | 50 | 91 |
| Difference between Kill of Test Sample and Official Test Insecticide | +1 | +41 |

The product of Example I was also found to stabilize halogen containing compounds such as DDT against oxidative deterioration and corrosiveness due to the action of sunlight. By way of example, a solution of 5 per cent by weight of 2,2-bis(p-chlorophenyl)-1,1,1-trichloroethane dissolved in a relatively inert solvent and a similar solution containing additionally 1 per cent by weight of the reaction product of Example I were exposed to ultra-violet light for 10 hours. The composition containing DDT alone became highly acidic and corrosive due to the formation of acidic compounds and corroded polished steel strips in contact therewith. On the other hand, the composition containing the minor proportion of the product of Example I was found to remain neutral, leaving similar steel strips uncorroded. In addition, this stabilizing effect produced by the reaction product of Example I is prevalent in residual coatings of a DDT toxicant. Thus, a test panel which had been sprayed with DDT solution alone and another test panel which had been sprayed with a solution containing DDT and the reaction product of Example I were exposed to ultra-violet light and then tested to determine the effectiveness of each panel against flies. At the end of 40 hours, the panel coated with DDT alone did not kill the flies coming in contact therewith, but the panel coated with DDT and 1 per cent of the reaction product of Example I lost none of its original toxicity toward flies even after 50 hours exposure to ultra-violet light. Furthermore, the presence of a minor amount of the reaction product of Example I was found to enhance the toxicity of DDT solutions toward *Musca domestica*, the common house fly. A 6 per cent solution of 2,2 bis(p-chlorophenyl) 1,1,1-trichloroethane, which exhibits a nearly complete kill for all practical purposes, was diluted with four volumes of naphtha per volume of DDT solution so that the solution only exhibited a kill of 50 per cent. The addition of 0.1 per cent by weight of the reaction product of Example I to this DDT solution produced a kill of 65 per cent, or an increase in kill of 15 per cent by Gulf Method 223.

Other halogen containing compounds such as gamma hexachloro cyclohexane are variously improved by the additives of our invention. The knockdown time of a hexachloro cyclohexane toxicant was substantially shortened by the reaction product of Example I, as evidenced by the experimental data shown in Table III.

*Table III*

| | 5% Solution of Hexachloro Cyclohexane in Naphtha | 5% Solution of Hexachloro Cyclohexane in Naphtha Containing 1% by Wt. of Product According to Example I |
|---|---|---|
| Inspection: Fly Killing Test—Method 223, Gulf— | | |
| Time of Knockdown, Sec.. | 300 | 36 |
| Kill, 24 Hr., Percent | 97 | 97 |

Because the kill of a 5 per cent solution of gamma hexachloro cyclohexane is so high, it was difficult to observe whether or not the additives of our invention exerted a synergistic effect thereon. For this reason, the 5 per cent solution was diluted with four volumes of naphtha to give a kill of only 35 per cent. The addition of 0.1 per cent by weight of the product of Example I to this solution produced a kill of 73 per cent, which indicates a pronounced synergistic effect on gamma hexachloro cyclohexane.

The thiocyano derivative toxicants such as beta butoxy, beta' thiocyanodiethyl ether, thiocyano esters of the higher fatty acids, bornyl thiocyano acetate, and fenchyl thiocyano acetate are stabilized by the reaction product of Example I against oxidative deterioration and rearrangement in the presence of sunlight and other oxidative environment. Furthermore, an insecticide containing 5 per cent fenchyl thiocyano acetate in naphtha was found to give a 70 per cent kill by Gulf Method 223 as compared to a 97 per cent kill obtained by the same composition to which had been added 1 per cent of the reaction product of Example I.

Thus, it is apparent that we have provided improved insecticidal compositions which are stabilized in many respects and which exhibit enhanced toxicity due to the presence of minor amounts of the novel calcium phthalamidate compounds described hereinabove. For most purposes minor amounts from about 0.1 to 1 per cent by weight of these compounds are sufficient to effect the desired results in insecticidal compositions, although amounts of from about 0.01 to 10 per cent may advantageously be employed. Moreover, it is contemplated, as shown hereinabove, that mixtures of various insecticide toxicants may be compounded with our additive, and our invention is not to be restricted to the specific examples herein described.

Resort may be had to such modifications and variations as fall within the spirit of the invention and the scope of the appended claims.

We claim:

1. An insecticidal composition comprising at least one insecticide toxicant, a solvent therefor, and a condensation product of formaldehyde and a substantially neutral calcium salt of an N-alkyl phthtalamidic acid, said condensation product having the following formula:

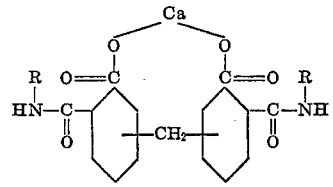

wherein R is an alkyl group having from 8 to 20 carbon atoms.

2. An insecticidal composition comprising an insecticide toxicant, a hydrocarbon solvent therefor, and from 0.01 to 10 per cent by weight of a condensation product of formaldehyde and a substantially neutral calcium salt of an N-alkyl phthalamidic acid, said condensation product having the following formula:

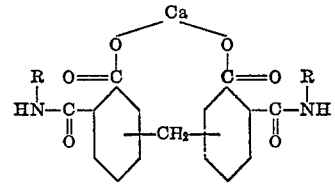

wherein R is an alkyl group having from 8 to 20 carbon atoms.

3. The composition of claim 1 wherein the said toxicant is a halogen-containing hydrocarbon insecticide toxicant.

4. An insecticidal composition comprising the toxicant, 2,2-bis(p-chlorophenyl) 1, 1, 1-trichloroethane, a solvent therefor, and from 0.01 to 10 per cent by weight of a condensation product of formaldehyde and a substantially neutral calcium salt of a phthalamidic acid, said condensation product having the following formula:

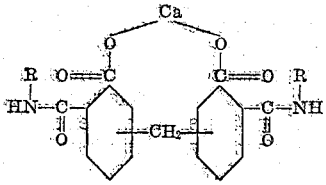

wherein R is an alkyl group having from 8 to 20 carbon atoms.

5. An insecticidal composition comprising a pyrethrin insecticide toxicant, a solvent therefor, and from 0.01 to 10 per cent by weight of a condensation product of formaldehyde and a substantially neutral calcium salt of a phthalamidic acid, said condensation product having the following formula:

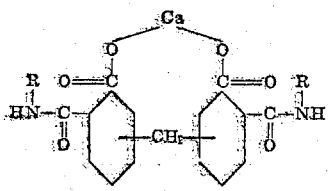

wherein R is an alkyl group having from 8 to 20 carbon atoms.

6. An insecticidal composition comprising an organic thiocyano insecticide toxicant, a solvent therefor, and from 0.01 to 10 per cent by weight of a condensation product of formaldehyde and a substantially neutral calcium salt of a phthalamidic acid, said condensation product having the following formula:

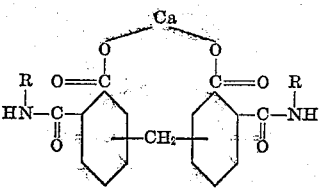

wherein R is an alkyl group having from 8 to 20 carbon atoms.

7. The composition of claim 4 wherein R is the "coco" radical.

8. The composition of claim 5 wherein R is the "coco" radical.

9. The composition of claim 6 wherein R is the "coco" radical.

10. An insecticidal composition comprising at least one insecticide toxicant selected from the group consisting of pyrethrin insecticide toxicants, halogenated hydrocarbon insecticide toxicants, organic thiocyano insecticide toxicants and mixtures thereof, a solvent therefor, and a condensation product of formaldehyde and a substantially neutral calcium salt of an N-alkyl phthalamidic acid, said condensation product having the following formula:

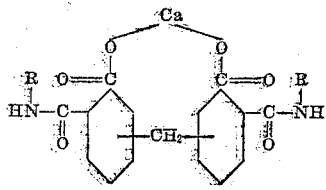

wherein R is an alkyl group having from 8 to 20 carbon atoms.

HERSCHEL G. SMITH.
MARK L. HILL.
TROY L. CANTRELL.

References Cited in the file of this patent

UNITED STATES PATENTS

| Number | Name | Date |
|---|---|---|
| 2,378,442 | Smith et al. | June 19, 1945 |
| 2,472,517 | Cantrell et al. | June 7, 1949 |
| 2,497,099 | Peters et al. | Feb. 14, 1950 |

OTHER REFERENCES

Goodhue, Committee on Medical Research of the O. S. R. D. Insect Control Committee Report Number 11, Summary of Interim Report Numbers 1 to 4, January 19, 1945, OEMcmr M—4331, sec. 2, pages 1 to 3.